United States Patent
Kulevsky

[11] Patent Number: 5,897,142
[45] Date of Patent: Apr. 27, 1999

[54] PUSH-TO-RELEASE QUICK CONNECTOR

[75] Inventor: Jonathan L. Kulevsky, Clinton Township, Mich.

[73] Assignee: ITT Automotive, Inc., Auburn Hills, Mich.

[21] Appl. No.: 08/770,590

[22] Filed: Dec. 19, 1996

[51] Int. Cl.[6] ............................................. F16L 37/084
[52] U.S. Cl. ...................... 285/308; 285/320; 285/921
[58] Field of Search .................................. 285/308, 319, 285/38, 921, 320, 87

[56] References Cited

U.S. PATENT DOCUMENTS

| | | | |
|---|---|---|---|
| 3,588,149 | 6/1971 | Demler | 285/110 |
| 3,990,727 | 11/1976 | Gallagher | 285/26 |
| 4,266,814 | 5/1981 | Gallagher | 285/319 |
| 4,641,859 | 2/1987 | Walters | 285/27 |
| 4,681,350 | 7/1987 | Gaita | 285/315 |
| 4,793,639 | 12/1988 | Glover et al. | 285/319 |
| 4,804,213 | 2/1989 | Guest | 285/308 |
| 4,844,512 | 7/1989 | Gahwiler | 285/39 |
| 4,968,879 | 11/1990 | Lichte | 285/319 X |
| 4,991,882 | 2/1991 | Gahwiler | 285/331 |
| 5,002,315 | 3/1991 | Bartholomew | 285/93 |
| 5,104,157 | 4/1992 | Bahner | 285/307 |
| 5,161,832 | 11/1992 | McNaughton et al. | 285/319 |
| 5,213,376 | 5/1993 | Szabo | 285/39 |
| 5,251,940 | 10/1993 | DeMoss et al. | 285/87 |
| 5,284,369 | 2/1994 | Kitamura | 285/322 |
| 5,303,963 | 4/1994 | McNaughton et al. | 285/319 |
| 5,374,088 | 12/1994 | Moretti et al. | 285/305 |
| 5,533,761 | 7/1996 | Ostrander | 285/38 |
| 5,568,946 | 10/1996 | Jackowski | 285/38 |

FOREIGN PATENT DOCUMENTS

| | | | |
|---|---|---|---|
| 340518 | 11/1989 | European Pat. Off. . | |
| 0459812 | 12/1991 | European Pat. Off. . | |
| 5272 | 11/1882 | United Kingdom | 285/81 |
| 2086513 | 5/1982 | United Kingdom . | |
| 9320379 | 10/1993 | WIPO . | |

*Primary Examiner*—Anthony Knight
*Assistant Examiner*—Greg Binda
*Attorney, Agent, or Firm*—Robert P. Seitter

[57] ABSTRACT

A quick connector formed of a housing having an internal bore receiving one end of a male connector with a radially enlarged annular flange. A retainer carried on the housing has a cylindrical sleeve disposed in the stepped bore in the housing. Pivotal tabs extend from the sleeve to fingers extending angularly inward into the bore to engage the annular flange and prevent axial disengagement of the male connector from the housing. Release members extend from each tab and are adapted for pivotal, radially outward movement causing like radially outward movement of the fingers to disengage the fingers from the annular flange and to allow separation of the male connector from the housing. Lock surfaces carried on the housing engage the release members during radially inward movement of the release members caused by an axial load on the male connector to resist axial separation of the housing and male connectors.

16 Claims, 3 Drawing Sheets

PUSH-TO-RELEASE QUICK CONNECTOR

BACKGROUND OF THE INVENTION

1. Field of the Invention

The present invention relates to snap-fit or quick connectors and, more particularly, to quick connectors which are employed in fluid conduit systems to facilitate assembly and disassembly of the fluid conduits.

2. Description of the Art

Snap-fit or quick connectors have been found to be useful in a wide range of applications. In particular, they are frequently employed for joining fluid carrying conduits in automotive and industrial applications. Such connectors have found general acceptance as they are typically capable of being closed in a single uniaxial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system. Although tools are often required to effect release of quick connect fittings, squeeze-to-release designs provide for manual release of the fitting without the necessity of separate tools. Although representing an advancement in the art, such "squeeze-to-release" designs often have certain shortcomings.

In applications where hazardous material is to flow through a fitting, prevention of inadvertent release is of primary concern. Accordingly, relatively high axial pull-apart strength specifications are mandated. In order to comply with such specifications, manufacture's of prior art designs typically employed material with a relatively high characteristic flex modulus (such as glass filled Nylon 12) to prevent warping or deformation of abutting locking surfaces within the connector under axial loading conditions. Unfortunately, materials with increased flex modulus are inherently stiffer and can require substantially higher release forces. A related problem is found in that the stiffer material tolerates only relatively short radial displacement of the female connector abutment surface to effect release. This provides relatively little "purchase" (or degree of radial overlap) of the mating abutment surfaces in the engaged condition, thereby exacerbating potential pull apart problems.

Lastly, known prior art designs were prone to fatigue leading to failure after a relatively small number of engagement-disengagement cycles.

The squeeze-to-release quick connector shown in U.S. Pat. No. 5,213,376, assigned to the assignee of the present invention, was designed to overcome these shortcomings. This connector has a pair of parallel arranged beam members, each affixed at one end to a retaining ring and at the other end to a mount located on the outside surface of the body portion of a female connector member. Two or more spaced detents extend inwardly from the retaining ring to capture an abutment surface of a male connector member to effect positive axial engagement between the female and male members. The beam members preferably extend axially a distance approximately equal to the characteristic inner diameter of the body portion of the female member.

The squeeze-to-release quick connector shown in FIG. 1 of U.S. Pat. No. 5,568,946 is similar to the last described quick connector, but further includes a pair of axially extending fingers projecting from each detent toward the bore in the female connector part. The figures are engageable with the abutment on the male connector.

While such squeeze-to-release quick connectors exhibit high pull off forces, certain applications required even higher pull off forces. This led to the development of the squeeze-to-release quick connector with snap-in retainer shown in U.S. Pat. No. 5,568,946. In this connector, a pair of receivers are formed on the female connector housing and receive deflectable latch arms formed on a retainer to releasibly couple the retainer to the housing. Thin tabs extend from a sleeve formed on the retainer to pressure receiving pads which are spaced apart and interconnected by arcuate shaped ring members. A finger extends angularly inward from each pad to engage the abutment on the male connector and to prevent axial disengagement of the male connector from the housing until the fingers are clear of abutment on the male connector displaced radially outward by inward pressure on the pads.

In certain applications, the open end of the quick connector housing is located in a relatively inaccessible position and is closely surrounded or immediately adjacent to other components which make the use of a separate tool to separate the fitting from the female connector or to simply grasp and squeeze the pressure pads on a squeeze-to-release type quick connector relatively difficult if not impossible due to the limited available space. Such limited space factors also make quick connecters with a push-to-release member on one of the connector components difficult to remove from the fitting.

Thus, it would be desirable to provide a quick connector having easily operable means for effecting release of the retainer from the abutment on the male connector part for disengagement of the female and male connector parts. It would be desirable to provide such a quick connector which also has increased end form pull out force.

SUMMARY OF THE INVENTION

The present invention is a unique push-to-release quick connector which provides advantages over previously devised quick connectors, particularly in applications with minimal clearances which make conventional quick connectors difficult to operate.

The quick connector of the present invention forms a fluid sealed coupling between a female connector component and a male connector component typically in the form of a cylindrical member having a outwardly extending annular flange with an abutment surface. The female connector part is in the form of a housing having a through bore extending from a first end to a second end. A retainer is coupled to the housing.

The retainer is in the form of an annular body having a through bore which is disposed in the through bore in the housing. A finger hingedly connected to the housing extends radially inward into the bore to engage the abutment surface on the male connector part to decouplingly lock the male connector part in the housing of the female connector part.

A release member is coupled to each finger and extends therefrom for pivotal outward movement from the retainer body. Such outward pivotal movement of the release member causes like radially outward pivotal movement of the finger to disengage the finger from the abutment surface on the male connector to enable separation of the housing from the male connector.

In one embodiment, the retainer is decouplingly mounted in the housing. Receiver means on the housing receive at least one latch arm extending from the body of the retainer.

In one embodiment, a lock surface is formed on the housing of the female connector part. The lock surface is engageable with a portion of release member as the release member pivots radially inward under an axial load exerted on the male connector part. The engagement of the release member with the lock surface resists axial separation of the female connector part from the male connector part and increases the end form pull out resistance of the present quick connector.

The push-to-release quick connector of the present invention provides a significant advancement in the quick connector art, particularly by providing a quick connector which has a unique push-to-release action thereby enabling the quick connector to be easily operated for separation of the connector parts in a small, confined space. Further, the unique lock surfaces provided on the housing which is engageable with the release members on the retainer as the release members pivot radially inward under an axial load exerted on the male connector, resist axial pull off thereby providing substantially higher end form pull off resistance for the quick connector.

BRIEF DESCRIPTION OF THE DRAWING

The various features, advantages and other uses of the present will become more apparent by referring to the following detailed description and drawing in which.

DESCRIPTION OF THE PREFERRED EMBODIMENTS

Figure 1:
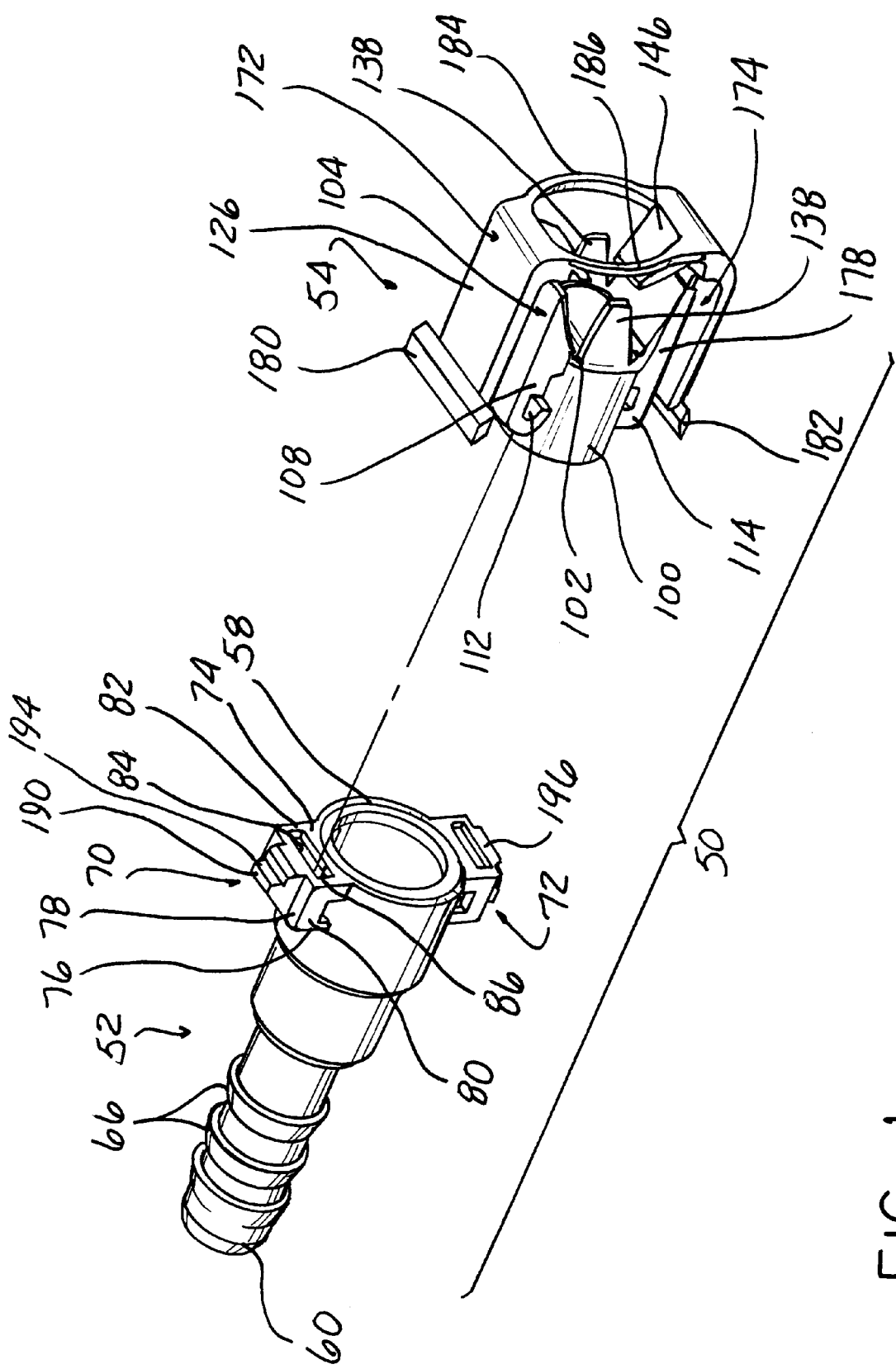
FIG. 1 is perspective view of a push-to-release quick connector constructed in accordance with one embodiment of the present invention.
Figure 2:
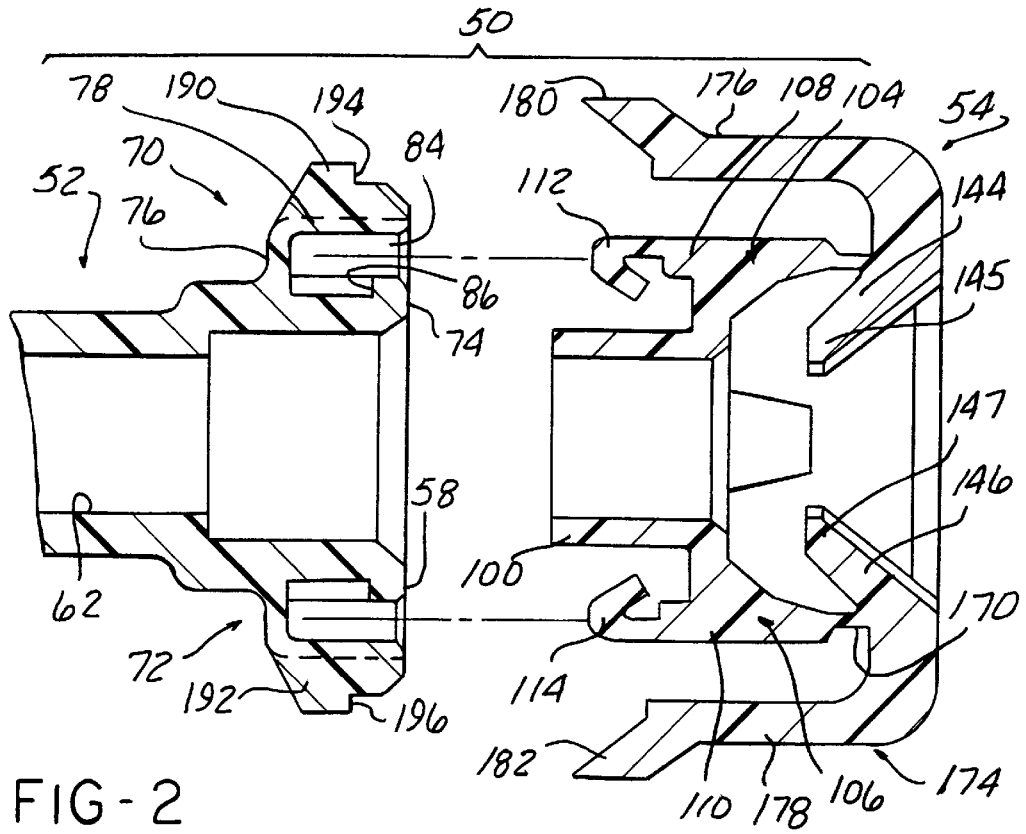
FIG. 2 is an exploded longitudinally cross-sectioned, view of the quick connector shown in FIG. 1.
Figure 3:
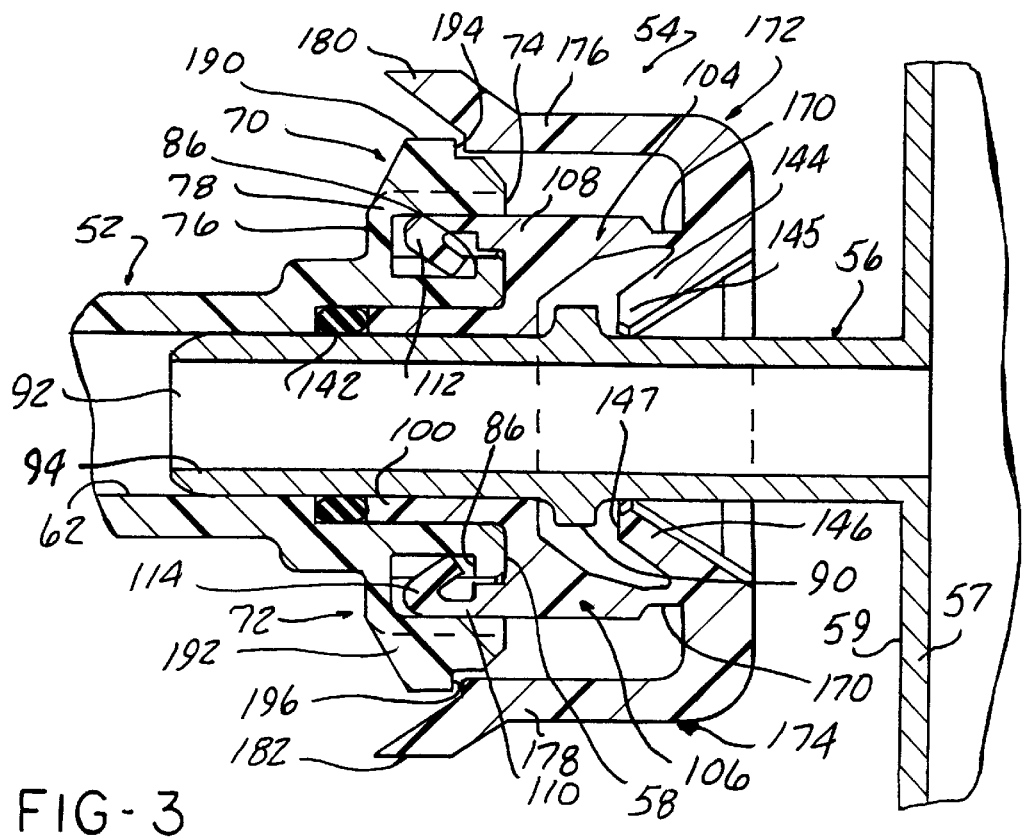
FIG. 3 is a longitudinal cross sectional, assembled view of the quick connector shown in FIGS. 1 and 2.

Referring now to the drawing, and to FIGS. 1–4 in particular, there is depicted one embodiment of a push-to-release quick connector 50 of the present invention. The quick connector 50 includes a female connector part 52, a retainer 54 and, as shown in FIG. 3, a male connector part or fitting 56 integrally projecting from a container 57. The quick connector 50 is adapted for incorporation in a system of tubular conduits for conducting fluid flow. However, it is contemplated, that in the broadest sense, the present inventive quick connector could be readily adapted for other applications in view of the present specification.

The female connector part 52 is in the form of an elongated, hollow housing having a first end 58 and an opposed second end 60. A stepped bore 62 is formed within the female connector part 52 and extends axially from the open first end 58 to the second end 60. A plurality of annular barbs 66 are formed on the exterior of a second end portion of the female connector part 52 for receiving a flexible conduit, not shown, thereover.

At least one and, preferably, a pair of receiver means denoted generally by reference numbers 70 and 72 are formed on the housing of the female connector part 52, as an integral one piece unitary part of the housing. The receiver means 70 and 72 are diametrically opposed adjacent the open first end 58 of the female connector part 52 and provide a means for detachable receiving and mounting the retainer 54 on the female connector part 52 in the desired orientation.

As each receiver means 70 and 72 as identically constructed, the following description with reference to receiver means 70 will be understood to apply equally to the other receiver means 72. By way of example, the receiver means 70 is in the form of a hollow receptacle, hereafter also denoted by reference number 70, which is attached to or preferably integrally formed with the female connector part 52. The receptacle 70 is formed with a first end wall 74, an opposed second end wall 76, a top wall 78 and opposed side walls 80 and 82. An aperture 84 is formed in the first end wall 74 leaving a raised lip 86 in the end wall 74, the lip 86 extending radially outward from the housing. The radially outward edge of the lip 86 is spaced from the opposed portion of the outer wall 78 thereby forming the aperture 84 with a sufficiently sized opening to receive a portion of the retainer 54 as described hereafter.

Figure 4:
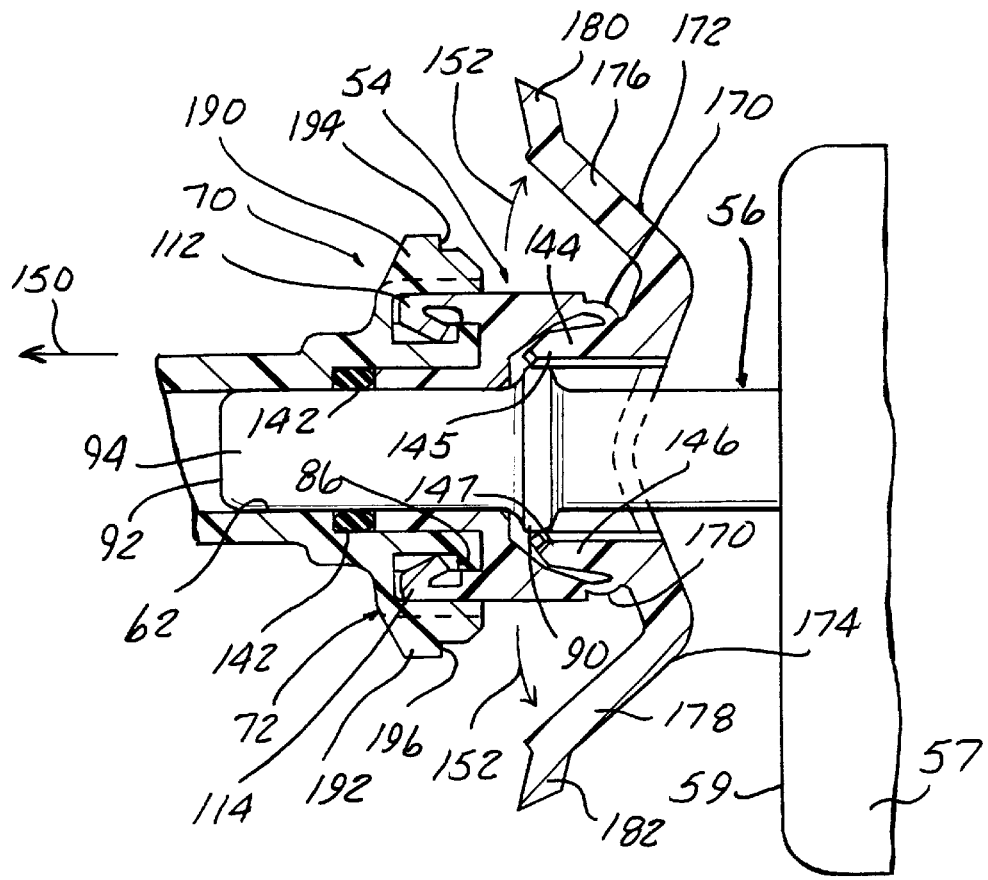
FIG. 4 is a partial cross sectional view, generally similar to FIG. 3, but illustrating the retainer in a release position.

As is conventional, the male connector part 56, shown in FIGS. 3 and 4, is in the form of a conduit or tube having a generally cylindrical, hollow shape. In an exemplary application, the male connector part 56 projects from a sidewall 59 of a container, support, etc. An enlarged, annular, radially outward extending flange 90 or abutment surface is formed on the male connector part 56 spaced from one end 92 of the male connector part 56. A first end portion 94 on the male connector part 56 extending between the one end 92 and the annular flange 90 is adapted to be slidingly inserted into the stepped bore 62 of the female connector part 52 and held in a fluid sealed coupled relationship with the female connector part 52 by means of the retainer 54.

As shown in FIGS. 1–4, the retainer 54 is in the form of an integral, one piece body formed of a suitable plastic, such as polyketone, for example only. A hollow, generally cylindrical sleeve 100 is formed at one end of the retainer 54 and is adapted to be slidably inserted through the open first end 58 and into the initial portion of the stepped bore 62 in the female connector part 52. The inner surface of the cylindrical sleeve 100 serves as a bushing or bearing surface for the male connector part 56 and eliminates the need for a separate top hat or bushing as used in previous quick connector designs.

An enlarged annular ring 102 is formed at one end of the cylindrical sleeve 100 and forms a mounting base for at least one and preferably a plurality of at least two, latch means 104 and 106. Each latch means 104 and 106 is identically constructed and includes a latch arm 108 and 110, respectively, which extends axially from the annular ring 102 parallel to and spaced from the outer surface of the cylindrical sleeve 100. The outer end of each latch arm 108 and 110 terminates in an angularly bent inward latch finger 112 and 114, respectively, which extends reversely from an outer end of each latch arm 108 and 110 angularly inward toward the ring 102. Each latch finger 112 and 114 is angularly disposed with respect to the adjacent portion of each respective latch arm 108 and 110.

Due to the flexible nature of the plastic material used to form the retainer 54, the latch fingers 112 and 114 are capable of exhibiting movement with respect to the remaining portion of each latch arm 108 and 110 so as to be urged toward the adjacent portion of each latch arm 108 and 110 as the ends of each latch arm 108 and 110 are inserted into the apertures 84 in the receivers 70 and 72, respectively. When the outer free end of each latch finger 112 and 114 clears the lip 86 formed in each receiver 70 and 72, the latch fingers 112 and 114 snap radially inward, as shown in FIG. 4, behind the raised lip 86 to detachably couple the retainer 54 to the female connector part 52. Since the aperture 84 formed in each receiver 70 and 72 by the top wall 78, the side walls 80 and 82 and the one end wall 74 has a size approximately the width of each latch arm 108 and 110, the latch arms 108 and 110 are fixedly held in a non-rotatable position with respect to the female connector part 52 when the latch arms 106 and 110 are snapped into the respective receiver 70 and 72.

A pair of extensions 138 are also diametrically formed on the retainer 54 and extend from the sleeve 100. The extensions 138 prevent any misalignment of the end of the male connector part 56 during insertion of the male connector part 56 through the retainer 54 into the female connector part 52.

A pair of thin tabs 170, which function as flexible hinges, project from one end of each latch arm 108 and 110 and are connected to one of a pair of wings 172 and 174, respectively. Each wing 172 and 174 has a generally elongated arm 176 and 178, respectively, which projects from the thin tabs 170 toward the sleeve 100. The outer ends of each arm 176 and 178 are formed in a tapered edge 180 and 182, respectively. The arms 176 and 178 are spaced from the latch arms 104 and 106 and are capable of radial outward movement with respect to the latch arms 104 and 106, as described hereafter.

A pair of thin, arcuate-shaped ring members 184 and 186 are integrally formed with and extend from opposite sides of one end of each wing 172 and 174. The ring members 184 and 186 are capable of flexing during pivotal movement of the wings 172 and 174, as described hereafter.

A pair of angularly disposed fingers 144 and 146 are integrally formed on the retainer 54 and extend angularly and radially inward from outer ends of the wings 172 and 174, respectively, as shown in FIGS. 1–4. Each finger 144 and 146 terminates in an outer end 145 and 147, respectively, which ends 145 and 147 are spaced apart a distance less than the nominal O.D. of the radially enlarged flange 90 on the male connector part 56. In this manner, the fingers 144 and 146 are capable of angular radially outward displacement during insertion of the male connector part 56 into the female connector part 52 so as to be more radially outward from the nominal position shown in FIG. 2 until the enlarged flange 90 on the male connector part 52 slides past the ends 145 and 147 of the fingers 144 and 146, respectively. The fingers 144 and 146 then snap back to their nominal position to retain the flange 90 on the male connector part 56 between the ends 145 and 147 of the fingers 144 and 146, respectively, and the sleeve 100 on the retainer 54 as shown in FIG. 3.

The quick connector 50 is also provided with a seal means preferably in the form of an elastomeric O-ring 142 as shown in FIGS. 3 and 4. The O-ring 142 has an O.D. to fit into the stepped bore 62 of the female connector 52 between an annular shoulder formed in the stepped bore 62 and the end of the sleeve 100 of the retainer 54. The O-ring 142 and the inner diameter of the sleeve 100 provide a fluid seal between the joined male connector 56 and the female connector 52.

In use, the retainer 54 is initially coupled to the female connector part 52 by sliding the latch arms 108 and 110 into the respective receivers 70 and 72 until the latch fingers 112 and 114 snap into position behind the raised lips 86 in each receiver 70 and 72 as shown in FIG. 3. Next, the end portion 94 of the male connector part 56 is inserted between the ring members 184 and 186, through the cylindrical sleeve 100 of the retainer 54 and into the stepped bore portion 62 of the female connector part 52. In this position, the fingers 144 and 146 snap into engagement with the flange 90 to lock the male connector part 52 in the female connector part 52.

When it is desired to decouple the male connecter part 56 from the female connector part 52 by axial movement of the female connector part 52 in the direction of arrow 150 shown in FIG. 4, outward directed pressure or force in the direction of arrows 152 in FIG. 4 is exerted on the outer ends 180 and 182 of each of the wings 172 and 174 to pivot the wings 172 and 174 about the tabs 170 in radially outward, opposed directions as shown in FIG. 4. This radially outward movement of the wings 172 and 174 also causes a radially outward pivoting of the ends 145 and 147 of the fingers 144 and 146. When the wings 172 and 174 have been moved outward a sufficient distance to the position shown in FIG. 4, the ends 145 and 147 of the fingers 144 and 146, respectively, will have moved radially outward a sufficient distance to clear a the outer diameter of the flange 90 on the male connector part 56 so as to enable the female connector part 52 to be moved axially in the direction of the arrow 150 out of engagement with the male connector part 56.

Another unique feature of the quick connect 50 of the present invention increases the axial pull out force of the connector 50. An enlarged lock member or pad 190 and 192 is formed on each receiver 70 and 72 as shown in FIGS. 1–4. Each lock member 190 and 192 respectively has a lock surface 194 and 196 formed thereon which is normally spaced apart from the wings 172 and 174 when the wings 172 and 174 are in their normal position during engagement of the male connector part 56 with the female connector part 52, as shown in FIG. 3. Any axial force exerted on the male component 56 which tends to move the male component 56 to the right in the orientation shown in FIGS. 1–4, urges the flange 90 on the male connector part 56 into engagement with the fingers 144 and 146, causing the fingers 144 and 146 to pivot radially inward about the tabs 170. This results in radially inward pivotal movement of the wings 172 and 174 bringing an edge on each wing 172 and 174, adjacent the outer ends 180 and 182, respectively, into engagement with the lock surface 194 and 196 on the lock members 190 and 192 to prevent axial separation of the male connector part 56 from the female connector part 52.

Figure 5:
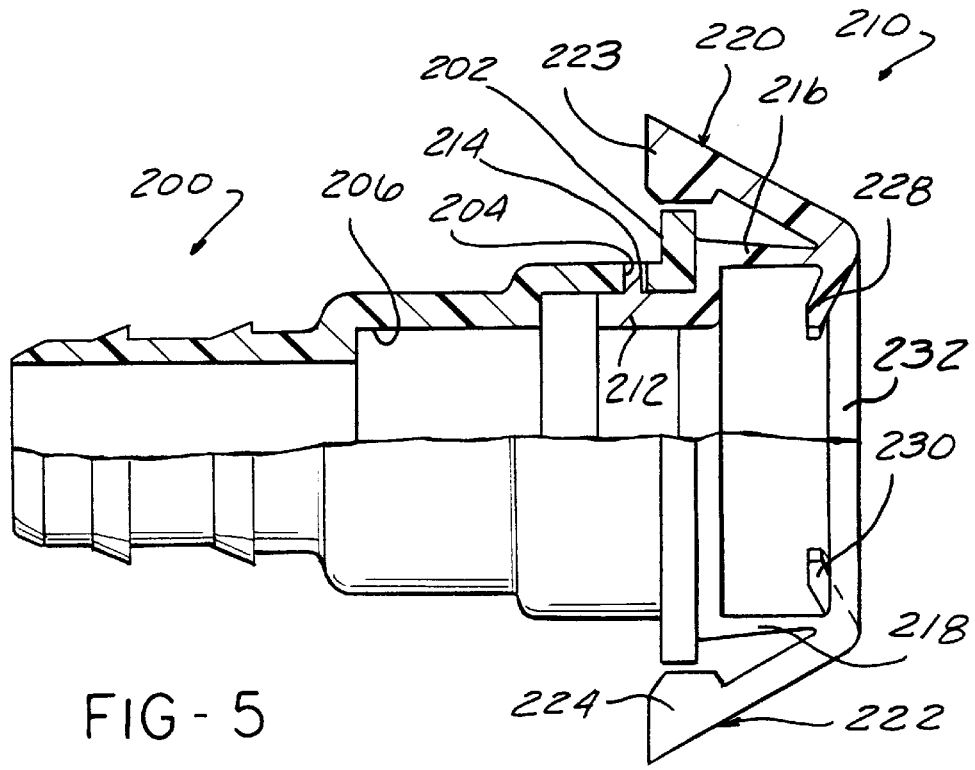
FIG. 5 is a partially cross-sectioned, side elevational view of alternate embodiment of the quick connector of the present invention.

FIG. 5 depicts an alternate embodiment of a quick connector which operates in substantially the manner as the quick connector 50 described above and shown in FIGS. 1–4. In this embodiment, the female connector part 200 has a radially outward extending flange 202 formed at a first end. A pair of diametrically opposed apertures 204 are formed in a tubular end portion of the female connector 200 adjacent the flange 202.

A retainer 210 has a cylindrical sleeve 212 which is mountable in a stepped bore 206 in the female connector 200. Radially outward extending projections 214 formed on the sleeve 212 of the retainer 210 are engageable in the apertures 204 in the female connector 200 to detachably couple the retainer 210 to the female connector 200. At least two diametrically opposed tabs 216 and 218 project axially from one end of the sleeve 212 and are disposed externally of the open first end of the female connector 200 when the sleeve 212 is mounted in the stepped bore 206 in the female connector 200.

A pair of wings 220 and 222 project angularly from one end of the tabs 216 and 218. The wings 220 and 222 are similar to the wings 172 and 174 described above and shown in FIGS. 1–4, and terminate in enlarged outer end grip pads 223 and 224, respectively. Angularly inward extending fingers 228 and 230 project from the end of the wings 220 and 222 and the tabs 216 and 218 as shown in FIG. 5. The fingers 228 and 230 are positioned to engage the flange 90 on a male connector, not shown, inserted into the female connector 200. A pair of arcuate-shaped ring members 232, only one of which is shown in FIG. 5, extend arcuately from opposite sides of one end of each of the wings 220 and 222.

The operation of the retainer 210 is identical to that described above for the retainer 54 in that radially outward push force exerted on the enlarged grip pads 223 and 224 of the wings 220 and 222 will cause the fingers 228 and 230 to also pivot radially outward to disengage the fingers 228 and 230 from the flange 90 on the male connector and to allow separation of the female connector 200 from the male connector.

It will also be clear from FIG. 5 that the retainer 210 could be integrally formed as a one piece extension of the female connector 200. In this embodiment, the sleeve 212, tabs 216 and 218, as well as the wings 220 and 222 and the angular fingers 228 and 230 could be integrally molded as part of the female connector 200.

In summary, there has been disclosed a unique push-to-release quick connector which has a high pull out force and is operable in confined spaces.

What is claimed is:

1. A quick connector adapted for selective locking engagement with a male connector having a radially extending abutment surface comprising:
    a housing having a through bore extending from a first end to a second end; and
    a retainer coupled to the housing, the retainer including:
        a body having a through bore, the body disposed through the first end of the housing in the through bore in the housing;
        at least one tab extending from a first end of the body;
        at least one finger extending radially and angularly inward from the at least one tab to engage an abutment surface on a male connector to decouplingly mount the male connector in the housing; and
        release means, coupled to and extending from the at least one finger and the at least one tab and radially moveable outward relative to the body, for disengaging the at least one finger from the abutment surface on the male connector upon such radially outward movement.

2. The quick connector of claim 1 wherein the release means comprises:
    a release member coupled to and extending from the at least one tab and the at least one finger and terminating in an outer free end;
    the outer free end of the release member pivotal radially outward about the body to pivot the at least one finger radially outward toward the at least one tab.

3. The quick connector of claim 2 wherein the release member extends from the at least one tab and the at least one finger toward the first end of the body.

4. The quick connector of claim 3 wherein the outer free end of the release member is concentrically spaced from the first end of the body.

5. The quick connector of claim 3 wherein the release member comprises an arm cantilevered from the at least one tab and the at least one finger.

6. The quick connector of claim 1 wherein:
    the at least one tab comprises a pair of diametrically opposed tabs;
    the at least one finger comprises a pair of diametrically opposed fingers, each extending radially inward from the pair of diametrically opposed tabs extending from the first end of the body; and
    the release means including a pair of diametrically opposed release members, each release member connected to one of the pair of tabs.

7. The quick connector of claim 1 further comprising:
    means, carried on the housing and the body, for detachably coupling the retainer to the housing.

8. A quick connector adapted for selective locking engagement with a male connector having a radially extending abutment surface comprising:
    a housing having a through bore extending from a first end to a second end; and
    a retainer coupled to the housing, the retainer including:
        a body having a through bore, the body disposed through the first end of the housing in the through bore in the housing;
        at least one tab extending from the first end of the body;
        at least one finger extending radially and angularly inward from the at least one tab to engage an abutment surface on a male connector to decouplingly mount the male connector in the housing;
        release means, extending from the at least one tab, for disengaging the at least one finger from the abutment surface on the male connector upon radially outward movement of the release means, the release means including:
            a release member extending from the at least one tab and terminating in an outer end;
            the release member pivoting about the body to pivot the at least one finger radially outward toward the at least one tab upon radially outward movement of the outer end of the release member; and
            means, carried on the housing, for lockingly engaging the outer end of the release member and resisting axial movement of the housing and body relative to the male connector under an axial separation force exerted on the male connector and the retainer.

9. The quick connector of claim 8 wherein the lockingly engaging means comprises:
    a lock surface carried on the housing and disposed for engagement with the outer end of the release member under radially inward movement of the release member.

10. A quick connector adapted for selective locking engagement with a male connector having a radially extending abutment surface comprising:
    a housing having a through bore extending from a first end to a second end; and
    a retainer coupled to the housing, the retainer including:
        a body having a through bore, the body disposed through the first end of the housing in the through bore in the housing;
        a pair of diametrically opposed tabs extending from the first end of the body;
        a pair of diametrically opposed fingers extending radially and angularly inward from the tabs to engage an abutment surface on a male connector to decouplingly mount the male connector in the housing;
        a pair of diametrically opposed release members each connected to and extending from the one of the pair of tabs, the release members disengaging the fingers from the abutment surface on the male connector upon radially outward movement of the release members; and means, carried on the housing, for lockingly engaging the outer end of each release member and resisting axial movement of the housing and body relative to the male connector under an axial separation force exerted on the male connector.

11. The quick connector of claim 10 wherein the engaging means comprises:

a pair of lock surfaces carried on the housing and engagement with the outer end of each release member under radially inward movement of each release member.

12. A quick connector adapted for selective locking engagement with a male connector having a radially extending abutment surface comprising:

a housing having a through bore extending from a first end to a second end; and a retainer detachably coupled to the housing, the retainer including:
a body having a through bore, the body mountable through the first end of the housing into the through bore in the housing;
a pair of diametrically opposed tabs extending from the first end of the body;
a pair of diametrically opposed fingers, each finger extending radially and angularly inward from each tab to engage an abutment surface on a male connector to decouplingly mount the male connector in the housing; and
a pair of diametrically opposed release members, each connected to and extending from the same end of each tab as one finger, the release members being pivotal about the end of the tabs to pivot the fingers radially outward toward the respective tab upon radially outward movement of the release member.

13. A quick connector adapted for selective locking engagement with a male connector having a radially extending abutment surface comprising:

a housing having a through bore extending from a first end to a second end; and a retainer detachably coupled to the housing, the retainer including:
a body having a through bore, the body mountable through the first end of the housing into the through bore in the housing;
a pair of diametrically opposed tabs extending from the first end of the body;
a pair of diametrically opposed fingers, each finger extending radially and angularly inward from each tab to engage an abutment surface on a male connector to decouplingly mount the male connector in the housing;
a pair of diametrically opposed release members, each connected to and extending from the same end of each tab as one finger, the release members being pivotal about the end of the tabs to pivot the fingers radially outward toward the respective tab upon radially outward movement of the release member; and means, carried on the housing, for lockingly engaging the outer end of each release member and resisting axial movement of the housing and body relative to the male connecter under an axial separation force exerted on the male connector.

14. The quick connector of claim 13 wherein the engaging means comprises:

a pair of lock surfaces carried on the housing and engageable with the outer end of each release member under radially inward movement of each release member.

15. A quick connector adapted for selective locking engagement with a male connector having a radially extending abutment surface comprising:

a housing having a through bore extending from a first end to a second end;

a pair of diametrically opposed tabs carried on and extending axially outward from the first end of the housing;

a finger extending angularly inward from an outer end of each tab to engage an abutment surface on a male connector to decouplingly mount the male connector into the housing; and at least a pair of circumferentially spaced release members each extending angularly outward from the outer end of one tab to pivot the finger out of engagement with the abutment surface on the male connector upon radially outward movement of the release member to effect separation of the male connector from the housing.

16. The quick connector of claim 15 wherein:

the pair of tabs, the finger on each tab and the at least a pair of release members are unitarily formed with the housing.

* * * * *